United States Patent
Li et al.

(10) Patent No.: US 9,069,669 B2
(45) Date of Patent: Jun. 30, 2015

(54) METHOD AND COMPUTER SYSTEM FOR MEMORY MANAGEMENT ON VIRTUAL MACHINE

(71) Applicant: Industrial Technology Research Institute, Hsinchu (TW)

(72) Inventors: Han-Lin Li, Taoyuan County (TW); Tzi-Cker Chiueh, Taipei (TW); Jui-Hao Chiang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 151 days.

(21) Appl. No.: 13/951,474

(22) Filed: Jul. 26, 2013

(65) Prior Publication Data

US 2014/0108764 A1    Apr. 17, 2014

Related U.S. Application Data

(60) Provisional application No. 61/712,279, filed on Oct. 11, 2012.

(51) Int. Cl.
*G06F 12/00* (2006.01)
*G06F 12/08* (2006.01)
*G06F 9/455* (2006.01)
(Continued)

(52) U.S. Cl.
CPC ............... *G06F 12/08* (2013.01); *G06F 9/455* (2013.01); *G06F 9/45558* (2013.01); *G06F 12/0253* (2013.01); *G06F 12/0223* (2013.01); *G06F 12/109* (2013.01); *G06F 9/45533* (2013.01);
(Continued)

(58) Field of Classification Search
CPC . G06F 12/00; G06F 12/0223; G06F 12/0253; G06F 12/08; G06F 12/109; G06F 9/455; G06F 9/45533; G06F 9/45558; G06F 2009/45583
See application file for complete search history.

(56) References Cited

U.S. PATENT DOCUMENTS

| 4,422,145 A | 12/1983 | Sacco et al. |
| 6,131,150 A | 10/2000 | DeTreville |

(Continued)

FOREIGN PATENT DOCUMENTS

| CN | 101986285 | 3/2011 |
| CN | 102460400 | 5/2012 |
| TW | 200745951 | 12/2007 |

OTHER PUBLICATIONS

Gupta, "Compcache: in-memory compressed swapping," Eklektix, Inc., May 26, 2009, pp. 1-8.
(Continued)

*Primary Examiner* — Shawn X Gu
(74) *Attorney, Agent, or Firm* — Jianq Chyun IP Office

(57) ABSTRACT

A memory management method for a virtual machine system is provided. First, a first threshold value is set by a processor. A balloon target is then set to an allocated virtual memory size and decremented by a first decrement value stepwise by the processor according to a swapin/refault detecting result in a first adjustment state. The swapin/refault detecting result is generated by detecting at least one swapin or refault events by the processor. The balloon target stops being decremented by the processor according to the swapin/refault detecting result in a cool-down state. The balloon target is decremented by a second decrement value stepwise by the processor in a second adjustment state which is after the cool-down state. The second decrement value is less than the first decrement value, and the balloon target is not less than the first threshold value.

22 Claims, 2 Drawing Sheets

(51) Int. Cl.
*G06F 12/02* (2006.01)
*G06F 12/10* (2006.01)
*G06F 12/12* (2006.01)

(52) U.S. Cl.
CPC ...... *G06F 2009/45583* (2013.01); *G06F 12/02* (2013.01); *G06F 12/123* (2013.01)

(56) References Cited

U.S. PATENT DOCUMENTS

| | | |
|---|---|---|
| 6,516,397 B2 | 2/2003 | Roy et al. |
| 6,658,549 B2 | 12/2003 | Wilson et al. |
| 6,658,648 B1 | 12/2003 | Douceur et al. |
| 6,681,305 B1 | 1/2004 | Franke et al. |
| 6,804,754 B1 | 10/2004 | Franaszek et al. |
| 6,854,115 B1 | 2/2005 | Traversat et al. |
| 6,877,081 B2 | 4/2005 | Herger et al. |
| 6,910,106 B2 | 6/2005 | Sechrest et al. |
| 7,003,646 B2 | 2/2006 | Roy et al. |
| 7,007,150 B2 | 2/2006 | Valentin et al. |
| 7,127,560 B2 | 10/2006 | Cohen et al. |
| 7,181,736 B2 | 2/2007 | Douceur et al. |
| 7,380,089 B2 | 5/2008 | Herger et al. |
| 7,500,077 B2 | 3/2009 | Krauss |
| 7,516,291 B2 | 4/2009 | van Riel et al. |
| 7,698,513 B2 | 4/2010 | Sechrest et al. |
| 7,844,793 B2 | 11/2010 | Herger et al. |
| 7,934,035 B2 | 4/2011 | Miloushev et al. |
| 8,032,723 B2 | 10/2011 | Sechrest et al. |
| 8,099,487 B1 | 1/2012 | Smirnov et al. |
| 8,141,058 B2 | 3/2012 | Berg et al. |
| 8,161,260 B2 | 4/2012 | Srinivasan |
| 2011/0138147 A1 | 6/2011 | Knowles et al. |
| 2011/0320682 A1 | 12/2011 | McDougall et al. |
| 2012/0036325 A1 | 2/2012 | Mashtizadeh et al. |
| 2012/0124305 A1 | 5/2012 | Weissman et al. |
| 2013/0024641 A1* | 1/2013 | Talagala et al. ............... 711/170 |

OTHER PUBLICATIONS

Ghalimi, "Cloud Computing is Memory Bound" Intalio, Inc., May, 2010, pp. 1-10.
Cook, "Memory: The Real Data Center Bottleneck," SYS-CON Media Inc., Dec. 10, 2009, pp. 1-3.
Williams et al., "Overdriver: Handling Memory Overload in an Oversubscribed Cloud," Proceedings of the 7th ACM SIGPLAN/SIGOPS international conference on Virtual execution environments, VEE '11, Mar. 9-11, 2011, pp. 205-216.
Waldspurger, "Memory Resource Management in VMware ESX Server," Proceedings of the 5th Symposium on Operating Systems Design and Implementation (OSDI' 02), Dec. 2002, pp. 1-14.
Lu et al., "Virtual Machine Memory Access Tracing With Hypervisor Exclusive Cache," Proceedings of the USENIX Annual Technical Conference (USENIX'07), Jun. 2007, pp. 1-15.
Zhao et al., "Dynamic Memory Balancing for Virtual Machines," VEE '09, Mar. 11-13, 2009, pp. 21-30.
Magenheimer, "add self-ballooning to balloon driver," Xen. org, Apr. 24, 2008, pp. 1-2.
Gupta et al., "Difference Engine: Harnessing Memory Redundancy in Virtual Machines," OSDI '08, Oct. 2008, pp. 1-14.
Magenheimer, "Transcendent Memory on Xen," Xen Summit, Feb. 2009, pp. 1-3.
"Office Action of Taiwan Counterpart Application", issued on Apr. 10, 2015, p1-p4, in which the listed references were cited.

* cited by examiner

METHOD AND COMPUTER SYSTEM FOR MEMORY MANAGEMENT ON VIRTUAL MACHINE

CROSS-REFERENCE TO RELATED APPLICATION

This application claims the priority benefits of U.S. provisional application Ser. No. 61/712,279, filed on Oct. 11, 2012. The entirety of the above-mentioned patent applications is hereby incorporated by reference herein and made a part of this specification.

TECHNICAL FIELD

The disclosure relates to a technique of memory management on a virtual machine.

BACKGROUND

Computer virtualization is a technique involved in creation of a virtual machine that acts like a physical computing machine with an operating system, and a computer virtualization architecture is generally defined by the ability to concurrently support multiple operating systems on a single physical computer platform. For example, a computer that is running Microsoft Windows may host a virtual machine with a Linux operating system. A host machine is an actual physical machine on which the virtualization takes place, while a virtual machine is considered as a guest machine. A hypervisor, literally referred to as a virtual machine monitor (VMM), is a software layer that virtualizes hardware resources and presents a virtual hardware interface to at least one virtual machine. The hypervisor resembles to the way that a traditional operating system manages the hardware resources for processing and performs certain management functions with respect to an executing virtual machine. The virtual machine may be referred to as a "guest" and the operating system running inside the virtual machine may be referred to as a "guest OS".

The virtualized environment is currently memory-bound, which means that the physical memory of the host machine is the bottleneck of the resource utilization in a data center. Memory virtualization decouples the physical memory resources from the data center and then aggregates the resources into a virtualized memory pool which is accessible to the guest OS or applications running on top of the guest OS. In terms of memory virtualization, memory compression is one of the crucial topics to the memory resource management and utilization.

Similar to the traditional operating system, the last resort to increase memory utilization of the hypervisor is to reclaim the memory from the virtual machine by host swapping, i.e., to shift the memory pages of virtual machines to a physical swap disk, referred to as swap-out, mark a corresponding page table entry (PTE) of the virtual machines' physical address to machine address (P2M) table to be not-present, and then free the corresponding page to the free memory pool of the hypervisor, wherein the page table is a data structure used by the virtual machines to store the mapping between the virtual addresses and physical addresses. Later on, if the page is accessed again by the virtual machine, a page fault is triggered and the copy-on access (COA) mechanism is performed to bring the page content from a swap disk into a newly allocated memory page, referred to as swap-in. However, the overhead is highly unsatisfactory due to the long latency of disk input/output (I/O).

As another way to increase the memory utilization, memory compression may be done by compressing swapped-out pages of the virtual machines into smaller size of data and putting them together in a memory to save the physical memory disk used to store the original content. The idea is that the swapin from compressed memory would be faster than the swapin from the disk because the memory access is faster than the disk access.

Nonetheless, the memory compression is mostly considered as a secondary choice because it not only causes the COA, which triggers hardware trap and stops the current application execution, but also consumes the processor cycles of the host machine to compress and decompress the page content and incurs more overhead. Hence, the ideal situation is to avoid compression for the memory pages that are frequently accessed by the guest OS (i.e., the working set), but to find out the idle memory pages (i.e., the guest memory pages outside of the working set) for memory compression.

SUMMARY

One exemplary embodiment relates to a memory management method for a virtual machine system. The memory management method includes the following steps. First, a first threshold value is set by a processor. A balloon target is then set to an allocated virtual memory size and decremented by a first decrement value stepwise by the processor according to a swapin/refault detecting result in a first adjustment state. The swapin/refault detecting result is generated by detecting at least one swapin or refault events by the processor. The balloon target stops being decremented by the processor according to the swapin/refault detecting result in a cool-down state. The balloon target is decremented by a second decrement value stepwise by the processor in a second adjustment state which is after the cool-down state. The second decrement value is less than the first decrement value, and the balloon target is not less than the first threshold value.

One exemplary embodiment relates to a computer system including a memory and a processor. The processor is coupled to the memory and performs the following operation for memory management on a virtual machine system. The processor sets a first threshold value as well as sets a balloon target to an allocated virtual memory size and decrements the balloon target by a first decrement value stepwise according to a swapin/refault detecting result in a first adjustment state. The processor also generates the swapin/refault detecting result by detecting at least one swapin or refault event. The processor stops decrementing the balloon target according to the swapin/refault detecting result in a cool-down state. The processor also decrements the balloon target by a second decrement value stepwise in a second adjustment state which is after the cool-down state. The second decrement value is less than the first decrement value, and the balloon target is not less than the first threshold value.

Several exemplary embodiments accompanied with figures are described in detail below to further describe the disclosure in details.

BRIEF DESCRIPTION OF THE DRAWINGS

The accompanying drawings are included to provide a further understanding of the disclosure and are incorporated in and constitute a part of this specification. The drawings serve to illustrate exemplary embodiments of the disclosure and, taken together with the description, serve to explain the principles of the disclosure. However, they are not intended to limit the scope of the disclosure, which is defined by the accompany claims.

DETAILED DESCRIPTION OF DISCLOSED EMBODIMENTS

Figure 1A:
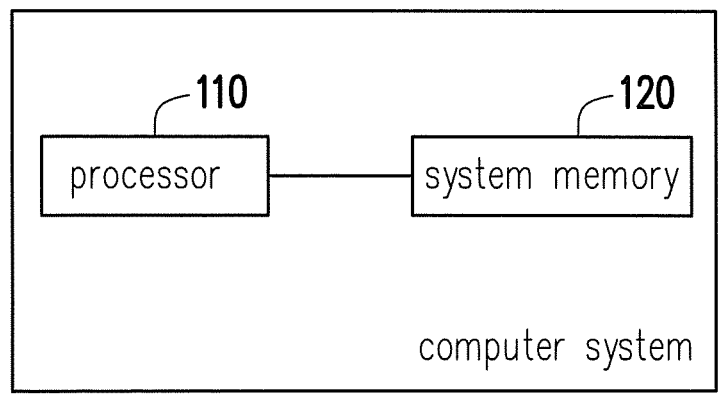
FIG. 1A is a block diagram of a computer system according to an exemplary embodiment of the present disclosure.

Reference will now be made in detail to the present exemplary embodiments of the disclosure, examples of which are illustrated in the accompanying drawings. Wherever possible, the same reference numbers are used in the drawings and the description to refer to the same or like parts.

For illustration purpose, one processor and one system memory are used in the following exemplary embodiments, and yet the present disclosure is not limited thereto. In other exemplary embodiments, more than one processor and more than one system memory could be used.

FIG. 1A is a block diagram of a computer system according to an exemplary embodiment of the present disclosure. Referring to FIG. 1, a computer system 100 includes a processor 110, a system memory 120, and other standard peripheral components (not shown), wherein the system memory 120 is coupled to the processor 110.

The processor 110 may be a dedicated or specialized processor configured to perform particular tasks by executing machine-readable software code languages that define functions related to operations to carry out the functional operations by communicating with other components of the computer system 100.

The system memory 120 stores software such as an operating system and temporarily stores data or application programs which are currently active or frequently used. Hence, the system memory 120, also referred to as a physical memory, may be a faster memory such as random access memory (RAM), a static random access memory (SRAM), or a dynamic random access memory (DRAM) for much faster access time.

Virtual memory is a technique for managing the resources of the system memory 120. It provides an illusion of a large amount of memory. Both the virtual memory and the system memory 120 are divided into blocks of contiguous memory addresses, which are also referred to as memory pages. The system memory 120 may, for example, include a compressed memory, which is associated with at least one virtual machine running on the computer system 100. The compressed memory temporarily stores less recently accessed memory pages in a compressed format to make more spaces available in the system memory 120.

Figure 1B:
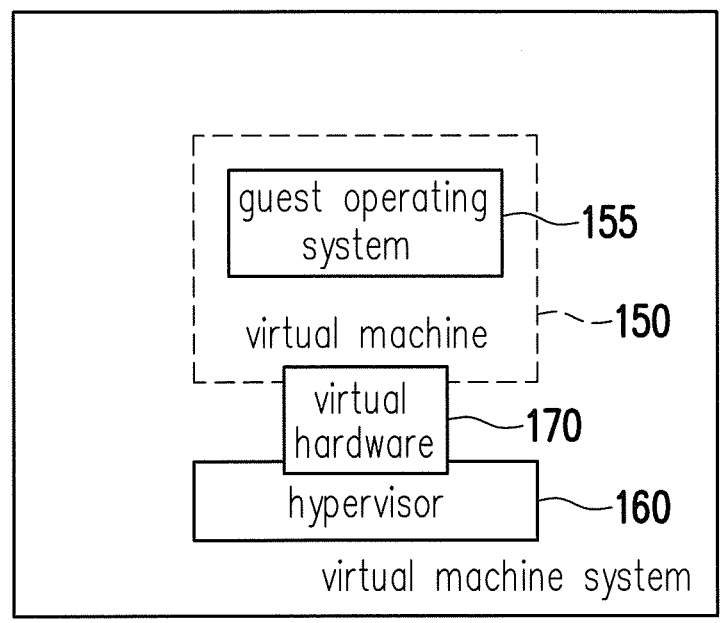
FIG. 1B is a block diagram of a virtual machine system according to an exemplary embodiment of the present disclosure.

A hypervisor is installed on the computer system 100 and supports virtual machine execution space within which at least one virtual machine may be concurrently instantiated and executed. FIG. 1B is a block diagram of a virtual machine system according to an exemplary embodiment of the present disclosure. In the present exemplary embodiments, only one virtual machine will be illustrated for simplicity, and yet the present disclosure is not limited thereto. In other exemplary embodiments, multiple virtual machines may co-exist and perform operations in a similar fashion.

Referring to FIG. 1B along with FIG. 1A, a virtual machine system 100' includes a virtual machine 150 with a guest OS 155 and other applications (not shown), a hypervisor 160, and a virtual hardware 170. The virtual hardware 170 including a processor, a memory, and I/O devices is abstracted and allocated as a virtual processor, a virtual memory, and virtual I/O devices to the upper running virtual machine 150. The hypervisor 160 manages the virtual machine 150 and provides emulated hardware and firmware resources. In one of exemplary embodiments, a Linux distribution may be installed as the guest OS 155 within the virtual machine 150 to execute any supported application, and open source software Xen supporting most Linux distributions may be provided as the hypervisor 160. The guest OS 155 includes a balloon driver (not shown). In conjunction with the hypervisor 160, the balloon driver may allocate or de-allocate the virtual memory for the guest OS 155 by invoking memory management algorithms. For example, by leveraging an existing page reclamation mechanism of the guest OS 155, a purposed True Working Set-based Ballooning algorithm, referred to as the TWS-ballooning algorithm, is developed to probe the working set and evict idle memory pages as a target of compression. For implementation, the Linux guest OS is specifically focused and yet the TWS-ballooning algorithm may also be leveraged to other guest OSs such as Microsoft Windows.

In more details, to make memory compression more efficient, it is essential to identify a working set of the virtual machine 150 by leveraging the page reclamation mechanism and compress the memory pages outside of the working set. Intuitively speaking, the working set of the virtual machine 150 is defined as the amount of memory being actively used by the virtual machine 150 in the recent past. For page reclamation, the Linux guest OS 155 uses a least recently used (LRU) criteria to determine an order in which to evict pages and maintains two LRU lists, an Active list and an Inactive list, for two major types of memory: an anonymous memory and a page cache. The memory pages of the anonymous memory are used by the heap and stack of user processes, and the memory pages of the page cache are backed by disk data where the content is cached in memory after the first access to the disk data to reduce future disk I/O. The memory pages in the Active list are considered to be accessed more frequently, referred to as hot pages; the pages in the Inactive list are considered to be accessed less frequently, referred to as cold pages. Upon allocation, each memory page is put into the Active list by default.

In one of exemplary embodiments, the page reclamation mechanism may be triggered directly when a kernel (such as the domU kernel) of the guest OS 155 fails to allocate memory. For instance, when a memory page is requested, the kernel may fail to find one from the free memory pool of the hypervisor 160. The kernel reclaims the memory from the Inactive list containing the memory pages which are considered to be relatively cold so that the reclaimed memory will not be soon accessed in the near future. When the number of memory pages in the Inactive list is not sufficient to fulfil the memory allocation request, the kernel may traverse the Active list and moves the cold pages from the Active list to the Inactive list.

One way to judge whether a memory page is hot or cold is to check and clear the hardware referenced bit of PTE for the memory page. Thus, if the referenced bit is turned on while the kernel traverses the Active list, the referenced bit is cleared and the memory page is then considered as a hot page and keeps staying in the Active list. Otherwise, the memory page is considered as a cold page and moved to the Inactive list.

If the memory page on the Inactive list is the anonymous memory, the kernel may swap-out the content to, for example, a swap disk, mark the corresponding PTE of the process to be not-present, and then free the corresponding memory page. Later on, if the memory page is accessed again, the COA mechanism is performed by bringing the page content from the swap disk into a newly allocated memory page, i.e., swap-in. Alternatively, if the memory page on the Inactive list belongs to the page cache, the kernel may flush the page content to the swap disk if it has been dirtied, and then the page is freed. Upon a next file access, the kernel has to again perform the disk access, referred to as refault, to bring the content back to a newly allocated page in the page cache. It is noted that, in one of exemplary embodiments, the swap disk may be an area on a hard disk (not shown) in the computer system 100 to offload the LSU pages from the system memory 120. However, in another exemplary embodiment, a portion of the system memory 120 may also be served as the swap disk if a user is experiencing slowness on the computer system 100.

Whenever the swapin or refault events occur, the virtual machine 150 will have performance degraded due to the disk I/O delay. In one of exemplary embodiments, from the viewpoint of the page reclamation, the performance overhead of the virtual machine 150 may be quantified by the summation of the swapin count and the refault count, referred to as overhead_count, which may be written as Eq (1):

$$\text{overhead\_count} = \text{swapin count} + \text{refault count} \quad \text{Eq (1)}$$

In the process of carrying out memory management for the virtual machine 150, the balloon driver may be instructed to inflate or deflate. The inflate command would be issued when the computer system 100 comes under memory pressure. The deflate command would be issued when the memory pressure has been relieved. Each inflate or deflate command includes an indication of the number of memory pages, referred to herein as a balloon target, of the virtual machine 150. The balloon target associated with an inflate or deflate command represents the number of guest physical memory pages to be reclaimed from the guest OS 155 or to return to the guest OS 155. In the Linux operating system, the total size of the anonymous memory consumed by all processes at an instant may be identified by the Committed_AS value using the reclamation mechanism. The Committed_AS value represents the anonymous memory that the virtual machine 150 consumes, but does not necessarily correspond to the working set size of the virtual machine 150. In other words, the Committed_AS value is incremented upon the first access to each newly allocated anonymous memory page but is decremented when the owner process explicitly releases the memory page. For instance, if a program allocates and accesses a memory page only once when the program starts but leaves it untouched until the program exits, the Linux kernel may not exclude this cold page from the Committed_AS value even thought it is clearly outside the working set. That is, if a page cache page belonging to the working set is evicted due to the memory reclamation, a refault event may occur and thus may be used as a signal that one more memory page should be added to the working set to accommodate the page cache.

Hence, in one of exemplary embodiments, a counter for refault events in the virtual machine 150 may be maintained and the balloon target may be adjusted according to the refault count so that the performance penalty resulting from evicted page cache may be minimized. Furthermore, the true working set of the virtual machine 150 may be actively probed. The true working set of the virtual machine 150 is lower than the Committed_AS value if the virtual machine 150 does not perform significant disk I/O, which require additional buffer cache pages included in the working set. Namely, the physical memory allocation of the virtual machine 150 is equal to its working set size, the disk access overhead associated with swapin and refault should be close to zero. Therefore, to probe the true working set of the virtual machine 150, the balloon target of the balloon driver may be gradually increased and stopped until the swapin and refault counts start to become non-zero.

To be more specific, in one of exemplary embodiments, an estimated working set size (EWSS) of the virtual machine 150 may be defined as Eq. (2)

$$\text{EWSS} = \text{allocated memory size} + \text{overhead count} \quad \text{Eq. (2)}$$

wherein the allocated memory size is the number of memory pages allocated to the virtual machine 150, and the overhead count is the number of pages faulted into the virtual machine 150 and is also defined in Eq. (1). However, in another exemplary embodiment, the estimated working set size (EWSS) of the virtual machine 150 may be a linear combination of the allocated memory size and the overhead count as written in Eq. (3)

$$\text{EWSS} = A_1 \times (\text{allocated memory size}) + A_2 \times (\text{overhead count}) + C \quad \text{Eq. (3)}$$

wherein $A_1 \geq 1$, $A_2 \geq 1$, and C is a constant.

When the allocated memory amount of the virtual machine 150 is above the true working set, the customized balloon driver is adapted for gathering swapin and refault counts every second and the balloon target is adjusted to probe the true working set of the virtual machine 150. The upper-bound of the balloon target is set to a configured memory size of the virtual machine 150 by the processor 110 when the virtual machine 150 boots up, and yet the lower-bound is set according to the amount of memory pinned down by the guest OS 155. In other words, the initial lower-bound value is calculated based on the Self-ballooning algorithm with an addition of memory requirements reserved for system emergency and compressed pages. Without the adjustment, the guest OS 155 may easily encounter an Out-Of-Memory exception when the Committed_AS value is low. To better approximate the true working set size of the virtual machine 150, the processor 110 employs three runtime states and adjusts the balloon target adaptively as shown in FIG. 2.

Figure 2:
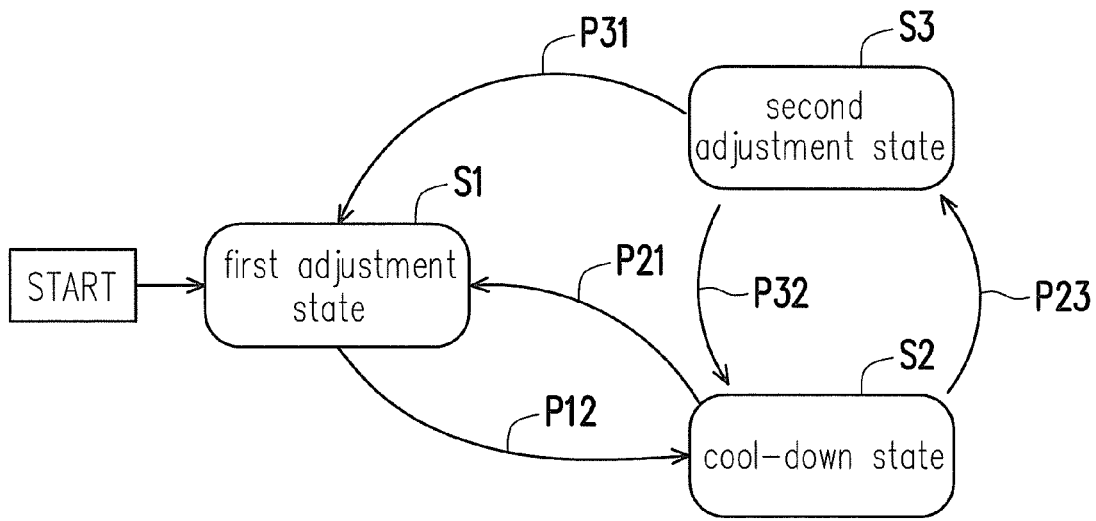
FIG. 2 is a state diagram illustrating a method for memory management on a virtual machine according to an exemplary embodiment of the present disclosure.

FIG. 2 is a state diagram illustrating a method for memory management on a virtual machine according to an exemplary embodiment of the present disclosure.

Referring to FIG. 2 along with the components in FIG. 1A and FIG. 1B, starting from a first adjustment state S1, the processor 110 initializes the balloon target of the balloon driver of the guest OS 155 to the a first threshold value, such as the Committed_AS value, since there is no explicit information on page cache at this moment. The Committed_AS value may be retrieved from an exported kernel variable vm_committed_AS, wherein the exported kernel variable may be accessed by any kernel component or loadable kernel modules in Linux. Then, the processor 110 lowers the balloon target by a first decrement value in a stepwise manner, wherein the balloon target is not less than the first threshold value. In the present exemplary embodiment, the first decrement value may be a percentage, such as 5%, of the current Committed_AS value. Whenever swapin or refault events occur, the processor 110 may generate a swapin/refault detecting result, wherein the swapin/refault detecting result may indicate an occurrence of the swapin or refault events. Based on the swapin/refault detecting result, the processor 110 may stop lowering the balloon target and switch the balloon driver from the first adjustment state S1 to a cool-down state S2 via a path P12. Then, the processor 110 raises the balloon target in the cool-down state S2 by an amount of memory whose page count is equal to the total number of the swapin and refault counts since each of the swapin or refault events suggests the need for additional free memory pages.

It is noted that, the swapin count may be retrieved from a variable (a variable pswpin for example) of a kernel component (a kernel component vmstat for example), which collects statistics about summary information such as operating system memory, processes, interrupts, paging and block I/O in Linux. The information of refault from disk I/O may be obtained by intercepting the I/O operation of, for example, a swap disk, by using a facility (a facility blktrace for example) in the Linux kernel, which provides application programming interfaces (APIs) to add a hook point to the disk I/O and performs statistics. Once the disk I/O is tracked, each block of the disk is initialized to a zero bitmap and set to a one bitmap when the corresponding disk block is accessed. A refault event is counted when a bitmap is already set before being changed to one, i.e. the corresponding block has been accessed before but requires another access.

Such swapin and refault events indicate that either the balloon target is approaching the true working set or there is a sudden burst in memory demand from applications. Hence, it is not wise to further decrease memory allocation of the virtual machine 150. Even when the swapin or refault events happen, the memory allocation to the virtual machine 150 is allowed to exceed the Committed_AS value. Such flexibility is especially important for the virtual machine 150 running a disk intensive workload wherein the Committed_AS value does not reflect the additional memory demand due to page caching.

Also in the cool-down state S2, the processor 110 initializes a cool-down counter to a second threshold value (e.g. arbitrarily set to 8) and decrements it in every time period from then on, wherein the time period may be one second. When the cool-down counter reaches zero, the processor 110 may consider that the workload burst has already gone and then switches the balloon driver to a second adjustment state S3 via a path P23.

The balloon target applies the same logic in the second adjustment state S3 as that in the first adjustment state S1 except that the processor 110 lowers the balloon target by a second decrement value in a stepwise manner, wherein the second decrement value is less than the first decrement value. In the present exemplary embodiment, the second decrement value may be a percentage, such as 1%, of the current Committed_AS value. To be more specific, the processor 110 lowers the balloon target by 1% of the current Committed_AS in a stepwise manner in the second adjustment state S3. Whenever the swapin or refault events occur, the processor 110 stops lowering the balloon target by switching the balloon driver from the second adjustment state S3 to the cool-down state S2 via a path P32. The processor 110 also raises the balloon target by an amount of memory whose page count is equal to the total number of the swapin and refault counts as well as re-initializes the cool-down counter to the second threshold value.

On the other hand, while the balloon driver is either in the cool-down state S2 or the second adjustment state S3, when the Committed_AS value of the virtual machine 150 changes, the processor 110 considers that the working set size of the virtual machine 150 is going to change significantly and resets the balloon target by entering the first adjustment state S1. That is, if the balloon target exceeds the Committed_AS value due to swapin or refault bursts, before the processor 110 switches the balloon driver to the first adjustment state S1, either from the second adjustment state S3 via a path P31 or the cool-down state S2 via a path P21, the processor 110 may reinitialize the balloon target to the Committed_AS value plus the exceeded amount as a new estimated working set size according to Eq. (2). That is, the first threshold value is changed at this moment. In another exemplary embodiment, the processor 110 may also reinitialize the balloon target to a linear combination of the Committed_AS value and the overhead count according to Eq. (3). It is also noted that, when the processor 110 switches the balloon driver from the cool-down state S2 to the first adjustment state S1 while the cool-down counter has not reached zero, the balloon driver still enters the first adjustment state S1 but the processor 110 continues the count-down until the cool-down counter reaches zero before resuming the working set probe.

Figure 3:
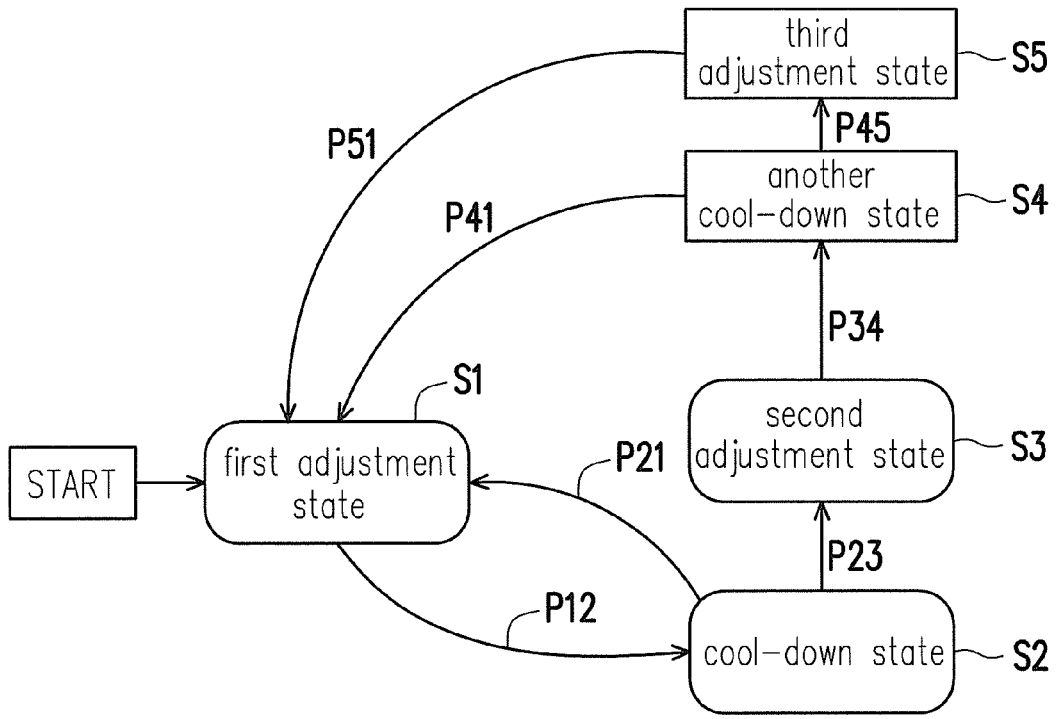
FIG. 3 is another state diagram illustrating a method for memory management on a virtual machine according to an exemplary embodiment of the present disclosure.

In one exemplary embodiment, before the processor 110 switches the balloon driver from the second adjustment state S2 to the first adjustment state S1, the swapin/refault events may be detected in more than one occasion. That is, the balloon driver may cycle between the cool-down state S2 and the second adjustment state S2 before entering the first adjustment state S1. As an example, FIG. 3 is another state diagram illustrating a method for memory management on a virtual machine according to an exemplary embodiment of the present disclosure. It is noted that, only the differences from the exemplary embodiment shown in FIG. 2 are explained hereinafter. The present disclosure is not limited thereto.

Referring to FIG. 3 along with the components in FIG. 1A and FIG. 1B, before the processor 110 switches the balloon driver from the second adjustment state S2 to the first adjustment state S1, it may switch the balloon driver to at least one another cool-down state S4 and at least one another second adjustment state (referred to as at least one third adjustment state S5) alternately according to the swapin/refault detecting result. In the present exemplary embodiment, only one another cool-down state S4 and one third adjustment state S5 are illustrated for purposes of clarity and ease of explanation. The present disclosure is not limited thereto.

To be more specific, when the balloon driver is in the second adjustment state S3, whenever the swapin or refault events occur, the processor 110 stops lowering the balloon target by switching the balloon driver from the second adjustment state S3 to the another cool-down state S4 via a path P34. The processor 110 also raises the balloon target by an amount of memory whose page count is equal to the total number of the swapin and refault counts and further initializes another cool-down counter to a third threshold value (e.g. arbitrarily set to 8). In the another cool-down state S4, the processor 110 decrements the another cool-down counter in every time period, wherein the time period may be one second. When the another cool-down counter reaches zero, the processor 110 may consider that the workload bust has already gone and then switch the balloon driver to the third adjustment state S5 via a path S45.

The balloon target applies the same logic in the third adjustment state S5 as that in the second adjustment state S2, except that the processor 110 lowers the balloon target by a third decrement value in a stepwise manner. In the present exemplary embodiment, the third decrement value is set to be equal to the second decrement value, that is, 1% of the current Committed_AS value.

In one exemplary embodiment, there are multiple another cool-down states S4 and third adjustment states S5 alternating to each other. Whenever the swapin or refault events occur, the processor 110 may then stop lowering the balloon target by switching the balloon driver from the third adjustment state S5 to the next another cool-down state in a similar fashion. Certainly, the processor 110 may further switch the balloon driver from the next another cool-down state to the next another third adjustment state according to the another cool-down counter. It is also noted that, the third decrement value in each of the another cool-down states may be distinct. The present disclosure is not limited herein.

Furthermore, similar to the second adjustment state S2 in FIG. 2, while the balloon driver is either in the another cool-down state S4 or the another third adjustment state S5, when the Committed_AS value of the virtual machine 150 changes, the processor 110 considers that the working set size of the virtual machine 150 is going to change significantly and resets the balloon target by entering the first adjustment state S1 via a path S41 and a path S51 respectively. The detail may refer to the related description in the exemplary embodiment of FIG. 3.

Through the aforementioned memory management method (i.e. the TWS-ballooning algorithm), the processor 110 may probe the true working set of the virtual machine 150 accurately and reclaim unnecessary cold pages to the memory pool of the hypervisor 160 to save more resources from the system memory 120 while keeping the application performance without noticeable degradation.

In an exemplary embodiment, the above-mentioned memory management method may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

To sum up, by leveraging an existing page reclamation mechanism of a guest OS, the memory management method in the present disclosure is designed to probe a true working set of a virtual machine and idle memory pages are evicted as the target of compression. By using a customized balloon driver, based on the current memory usage of the virtual machine with swapin/refault events taken into account, the true working set of the virtual machine may be estimated accurately and dynamically and further provides advantages of memory resource management.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A memory management method for a virtual machine system, comprising:
    setting a first threshold value by a processor;
    setting a balloon target of a balloon driver to an allocated virtual memory size and decrementing the balloon target by a first decrement value stepwise by the processor according to a swapin/refault detecting result in a first adjustment state;
    generating the swapin/refault detecting result by detecting at least one swapin or refault event by the processor;
    stopping decrementing the balloon target according to the swapin/refault detecting result in a cool-down state by the processor; and
    decrementing the balloon target by a second decrement value stepwise by the processor in a second adjustment state which is after the cool-down state, wherein the second decrement value is less than the first decrement value, and the balloon target is not less than the first threshold value.

2. The memory management method in claim 1 further comprising:
    switching the balloon driver from the cool-down state to the first adjustment state or switching the balloon driver from the second adjustment state to the first adjustment state by the processor when the first threshold value is changed.

3. The memory management method in claim 1, wherein the step of setting the balloon target to the allocated virtual memory size and decrementing the balloon target by the first decrement value stepwise by the processor comprises:
    setting the balloon target to a number of memory pages allocated to the virtual machine system by the processor; and
    decrementing the balloon target by a first percentage of the first threshold value stepwise by the processor.

4. The memory management method in claim 1, wherein after generating the swapin/refault detecting result, the method further comprising:
    incrementing the balloon target by an overhead count by the processor, wherein the overhead count is set according to a total number of the at least one swapin and refault events.

5. The memory management method in claim 2, wherein the step of switching the balloon driver from the second adjustment state to the first adjustment state by the processor when the first threshold value is changed further comprises:
    updating the first threshold value to a linear combination of the allocated virtual memory size and an overhead count; and
    resetting the balloon target to the updated first threshold value.

6. The memory management method in claim 1, wherein the step of stopping decrementing the balloon target according to the swapin/refault detecting result in the cool-down state by the processor further comprises:
    setting a counter to a second threshold value and decrementing the counter stepwise in the cool-down state by the processor.

7. The memory management method in claim 6 further comprising:
    switching the balloon driver from the cool-down state to the second adjustment state by the processor when the counter reaches zero.

8. The memory management method in claim 1, wherein the step of decrementing the balloon target by a second decrement value stepwise by the processor in the second adjustment state further comprises:
    decrementing the balloon target by a second percentage of the first threshold value stepwise by the processor.

9. The memory management method in claim 1 further comprising:
    switching the balloon driver from the second adjustment state to at least one another cool-down state and at least one third adjustment state alternately by the processor according to the swapin/refault detecting result; and
    switching the balloon driver from each of the at least one another cool-down state and the at least one third adjustment state to the first adjustment state by the processor when the first threshold value is changed.

10. The memory management method in claim 9 further comprising:
- setting an another counter to a third threshold value and decrementing the another counter stepwise in each of the at least one another cool-down state by the processor; and
- decrementing the balloon target by a third decrement value stepwise by the processor in each of the at least one third adjustment state,
- wherein when the another counter reaches zero, switching the balloon driver from each of the at least one cool-down state to a next third adjustment state of the at least one third adjustment state by the processor, and
- wherein when the swapin/refault detecting result is generated, switching the balloon driver from each of the at least one third adjustment state to a next cool-down state of the at least one cool-down state by the processor.

11. The memory management method in claim 1, wherein an upper-bound of the balloon target is set to the allocated virtual memory size by the processor when the virtual machine system is started, and wherein a lower-bound of the balloon target is set to an amount of memory pinned down by the virtual machine system by the processor.

12. A computer system comprising:
- a memory;
- a processor, coupled to the memory, wherein the processor performs an operation for memory management on a virtual machine system, the operation comprising:
- setting a first threshold value;
- setting a balloon target of a balloon driver to an allocated virtual memory size and decrementing the balloon target by a first decrement value stepwise according to a swapin/refault detecting result in a first adjustment state;
- generating the swapin/refault detecting result by detecting at least one swapin or refault event;
- stopping decrementing the balloon target according to the swapin/refault detecting result in a cool-down state; and
- decrementing the balloon target by a second decrement value stepwise in a second adjustment state which is after the cool-down state,
- wherein the second decrement value is less than the first decrement value, and the balloon target is not less than the first threshold value.

13. The computer system of claim 12, wherein the processor switches the balloon driver from the cool-down state to the first adjustment state or switches the balloon driver from the second adjustment state to the first adjustment state when the first threshold value is changed.

14. The computer system of claim 12, wherein the processor sets the balloon target to a number of memory pages allocated to the virtual machine system and decrements the balloon target by a first percentage of the first threshold value stepwise.

15. The computer system of claim 12, wherein the processor increments the balloon target by an overhead count, wherein the overhead count is set according to a total number of the at least one swapin and refault events.

16. The computer system of claim 15, wherein the processor updates the first threshold value to a linear combination of the allocated virtual memory size and the overhead count as well as resets the balloon target to the updated first threshold value.

17. The computer system of claim 12, wherein the processor sets a counter to a second threshold value and decrements the counter stepwise in the cool-down state.

18. The computer system of claim 17, wherein the processor further switches the balloon driver from the cool-down state to the second adjustment state by the processor when the counter reaches zero.

19. The computer system of claim 12, wherein the processor decrements the balloon target by a second percentage of the first threshold value stepwise.

20. The computer system of claim 12, wherein the processor further switches the balloon driver from the second adjustment state to at least one another cool-down state and at least one third adjustment state alternately according to the swapin/refault detecting result, and switches the balloon driver from each of the at least one another cool-down state and the at least one third adjustment state to the first adjustment state when the first threshold value is changed.

21. The computer system of claim 20, wherein the processor further sets an another counter to a third threshold value and decrements the another counter stepwise in each of the at least one another cool-down state, and decrements the balloon target by a third decrement value stepwise in each of the at least one third adjustment state,
- wherein the processor switches the balloon driver from each of the at least one cool-down state to a next third adjustment state of the at least one third adjustment state when the another counter reaches 0, and
- wherein the processor switches the balloon driver from each of the at least one third adjustment state to a next cool-down state of the at least one cool-down state when the swapin/refault detecting result is generated.

22. The computer system of claim 12, wherein the processor sets an upper-bound of the balloon target to the allocated virtual memory size when the virtual machine system is started, and wherein the processor sets a lower-bound of the balloon target according to an amount of memory pinned down by the virtual machine system.

* * * * *